United States Patent
Kim et al.

(10) Patent No.: US 8,060,061 B2
(45) Date of Patent: Nov. 15, 2011

(54) MOBILE COMMUNICATION TERMINAL AND METHOD FOR INITIALIZING THE MOBILE COMMUNICATION TERMINAL USING AN OVER-THE-AIR (OTA) DATA BACKUP

(75) Inventors: Youngwoong Kim, Gyeonggi-do (KR); Dohoon Roh, Seoul (KR); Jungeun Bae, Seoul (KR); Kwangyoung Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 1159 days.

(21) Appl. No.: 11/827,914

(22) Filed: Jul. 12, 2007

(65) Prior Publication Data

US 2008/0014914 A1    Jan. 17, 2008

(30) Foreign Application Priority Data

Jul. 14, 2006  (KR) ........................ 10-2006-0066457

(51) Int. Cl.
 *H04M 3/00* (2006.01)
(52) U.S. Cl. .................. 455/412.1; 455/412.2; 455/419; 455/420; 707/201
(58) Field of Classification Search ............... 455/412.1, 455/412.2, 419, 420; 707/201, 640, 661
 See application file for complete search history.

(56) References Cited

U.S. PATENT DOCUMENTS

| | | | | |
|---|---|---|---|---|
| 5,887,250 A | * | 3/1999 | Shah | 455/411 |
| 2004/0176086 A1 | * | 9/2004 | Chatterjee et al. | 455/418 |
| 2004/0203941 A1 | * | 10/2004 | Kaplan et al. | 455/466 |
| 2006/0089127 A1 | * | 4/2006 | Muratsu | 455/411 |
| 2008/0222629 A1 | * | 9/2008 | Rauma | 717/173 |
| 2008/0260156 A1 | * | 10/2008 | Baba et al. | 380/277 |
| 2009/0280796 A1 | * | 11/2009 | Macaluso | 455/419 |

FOREIGN PATENT DOCUMENTS

| | | |
|---|---|---|
| KR | 1020050119035 | 12/2005 |
| WO | 2006/018874 | 2/2006 |

* cited by examiner

*Primary Examiner* — Wayne Cai
*Assistant Examiner* — Julio Perez
(74) *Attorney, Agent, or Firm* — Lee, Hong, Degerman, Kang & Waimey

(57) ABSTRACT

A mobile communication terminal and a method for initializing a mobile communication terminal using an over-the-air (OTA) data includes receiving OTA data from a wireless network entity, storing the OTA data in a first database and a second database which are each associated with the mobile terminal, receiving a reset request which requests initialization of parameters associated with the operation of the mobile terminal and which are stored in the first database, and responsive to the reset request, updating parameters of the first database with corresponding parameters of the second database, and updating any remaining parameters of the first database with default parameters.

18 Claims, 4 Drawing Sheets

MOBILE COMMUNICATION TERMINAL AND METHOD FOR INITIALIZING THE MOBILE COMMUNICATION TERMINAL USING AN OVER-THE-AIR (OTA) DATA BACKUP

CROSS-REFERENCE TO RELATED APPLICATIONS

Pursuant to 35 U.S.C. §119(a), this application claims the benefit of earlier filing date and right of priority to Korean Patent Application No. 2006-066457, filed in Korea on Jul. 14, 2006, the entire contents of which are hereby incorporated by reference in their entirety.

FIELD OF THE INVENTION

This document relates to a mobile communication terminal and a method for initializing the mobile communication terminal using an over-the-air (OTA) data backup.

DESCRIPTION OF THE RELATED ART

An OTA service enables a series of data updates to be automatically carried out using OTA data received from an OTA server via a wireless interface instead of operating equipment or a user's operation. The OTA data can comprise a changed setting value, as well as firmware or other software upgrades or patches.

Conventionally, if the user selects a specific menu to request a reset of the mobile communication terminal, an active setting value of the mobile communication terminal is initialized to a default data value which was set when the mobile communication terminal was manufactured.

Therefore, if an error exists in the default data value set when the mobile communication terminal was manufactured, there is a disadvantage in that even when normal data received from the OTA server is set to an active setting value, the mobile communication terminal is initialized to the default data value having the error when the user requests a reset of the mobile communication terminal.

SUMMARY OF THE INVENTION

In one aspect of the present invention, there is provided a method for initializing a mobile terminal using over-the-air (OTA) data, the method includes receiving OTA data from a wireless network entity, storing the OTA data in a first database and a second database which are each associated with the mobile terminal, receiving a reset request which requests initialization of parameters associated with the operation of the mobile terminal and which are stored in the first database, and responsive to the reset request, updating parameters of the first database with corresponding parameters of the second database, and updating any remaining parameters of the first database with default parameters.

It is contemplated that the default parameters individually comprise manufacturer default values. It is further contemplated that method includes storing user initial setting data and data changed by a user in the first database, wherein upon receiving the reset request of the mobile terminal, the user setting data stored in the first database is initialized to the default parameters.

It is contemplated that the method further includes displaying a reset menu screen for performing initialization of the mobile terminal. It is further contemplated that method includes displaying a pop-up window informing a user when the OTA data update fails.

It is contemplated that the OTA data includes at least one of a data communication service, a voice communication service, a multimedia service, and a software upgrade. It is further contemplated that the user initial setting data and changed data is not stored in the second database.

It is contemplated that when the user request reset of the mobile terminal, the initialization is based on a latest OTA data stored in the second database. It is further contemplated that the first database comprises an account database, and the second database comprises a backup database.

In one aspect of the present invention, there is provided a mobile terminal, including a receiver for receiving over-the-air (OTA) data from a wireless network entity, a first database and a second database, each configured to store the OTA data, an input device for receiving a reset request which requests initialization of parameters associated with the operation of the mobile terminal and which are stored in the first database, and a controller configured to: responsive to the reset request, update parameters of the first database with corresponding parameters of the second database, and update any remaining parameters of the first database with default parameters.

It is contemplated that the default parameters individually comprise manufacturer default values. It is further contemplated that the controller stores user setting data changed by a user through the input device in the first database.

It is contemplated that upon receiving the reset request through the input device, the controller initializes the user setting data stored in the first database to the default parameters. It is contemplated that mobile terminal further includes a display displaying a reset menu screen for performing initialization of the mobile terminal.

It is contemplated that the display displays a pop-up window informing a user when the OTA data update fails. It is further contemplated that the OTA data comprises at least one of a data communication service, a voice communication service, a multimedia service, and software upgrade.

It is contemplated that the input device comprises at least one of a keypad, a joy stick, a jog-dial, and a touch screen.

It is further contemplated that the wireless transceiver includes, an RF transmitter for up-converting and amplifying a frequency of a transmitted OTA data signal, and a RF receiver for low-noise amplification of a received OTA data signal and down-converting the frequency of the received signal.

It is contemplated that when the user request a reset of the mobile terminal, the controller performs initialization based on a latest OTA data stored in the second database and stores the OTA data in the first database. It is further contemplated that the first database comprises an account database, and the second database comprises a backup database.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION OF THE PREFERRED EMBODIMENTS

Figure 1:
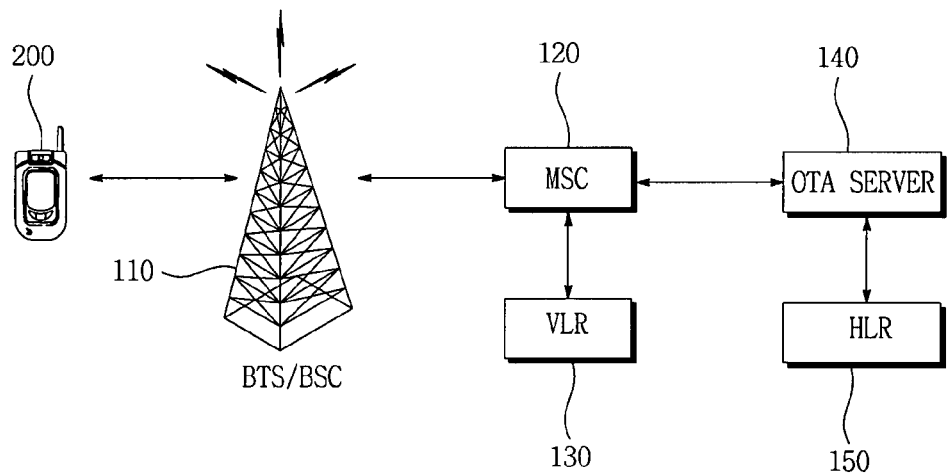
FIG. 1 is a diagram illustrating a mobile communication system which performs initialization of a mobile communication terminal using an over-the-air (OTA) data backup, according to an embodiment of the present invention.

The embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms.

The embodiments defined in the following description are specific details provided to assist those of ordinary skill in the art in a comprehensive understanding of the invention, and the present invention is only defined within the scope of the appended claims. In the entire description of the present invention, the same drawing reference numerals are used for the same elements across various figures.

A mobile communication terminal according to the present invention may comprise a cellular phone, a personal communication system (PCS), a personal data assistant (PDA), an international mobile communication-2000 (IMT 2000) terminal and other related devices.

FIG. 1 is a diagram illustrating a mobile communication system, which performs initialization of a mobile communication terminal using an OTA data backup according to an embodiment of the present invention.

Referring to FIG. 1, the mobile communication system comprises a mobile terminal 200, a base station transceiver subsystem/base station controller (BTS/BSC) 110, a mobile switching center (MSC) 120, a visitor location register (VLR) 130, an OTA server 140 and a home location register (HLR) 150.

The mobile terminal 200 allows a user to communicate while freely moving, and is located in the range of the BTS/BSC 110. Information of the mobile terminal 200 is sent to the MSC 120 via the BTS/BSC 110. The MSC 120 sends information to the mobile terminal 200 via the BTS/BSC 110.

The mobile terminal 200 receives various OTA data from the OTA server 140 via the BTS/BSC 110 and MSC 120. The term "OTA data" refers to information provided to the mobile terminal, such as a data communication service, a voice communication service, a multimedia message service, and other related services.

The BTS/BSC 110 typically includes a digital channel unit (DCU), a timing/frequency control unit (TCU), a radio frequency unit (RFU), and a global positioning system (GPS). The BTS/BSC 110 performs wireless communication with the mobile terminal 200.

The MSC 120 connects a call when a mobile subscriber makes or receives a phone call or other communication. The MSC 120 also performs the call setup and release function with the mobile terminal 200, various functions related with a call processing and additional services, and an interlocking function with other networks.

The VLR 130 is a database for storing visitor subscriber information in a service region of the MSC 120. The VLR 130 receives from the HLR 150 information of the mobile terminal 200 and other mobile subscribers, which are located in the service region, and then temporarily stores the received information. The VLR 130 is usually mounted in the MSC 120.

The OTA sever 140 sends OTA data related with voice and data communication to the mobile terminal 200 via the BTS/BSC 110 and the MSC 120. The OTA server 140 is usually operated by a communication service provider, and thus comprises the latest software version of the communication service provider.

Figure 2:
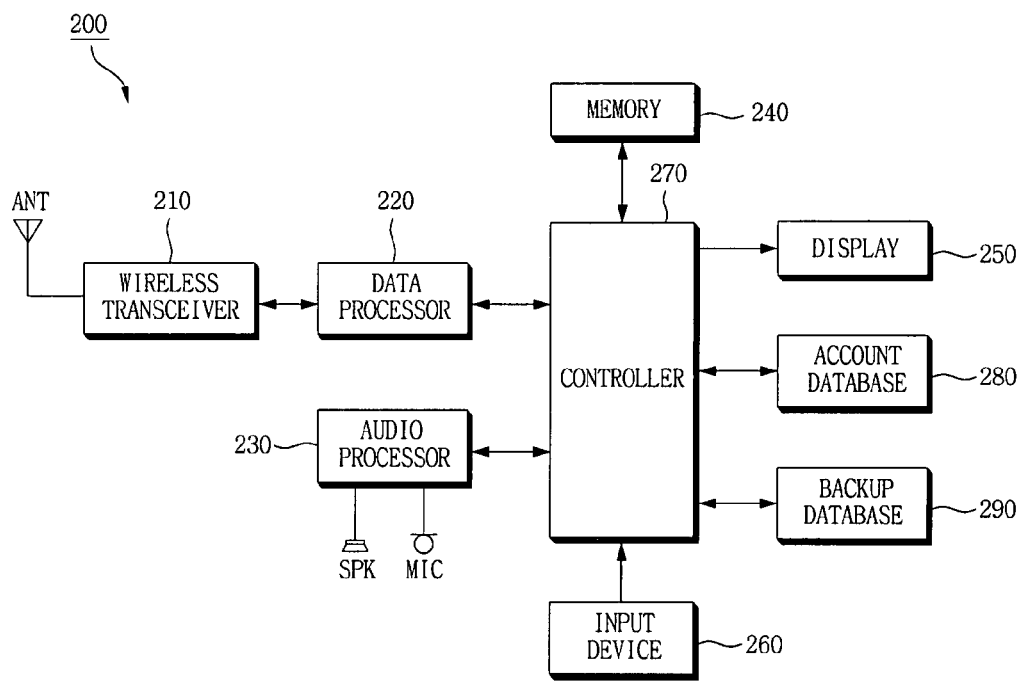
FIG. 2 is a block diagram illustrating the mobile communication terminal according to an embodiment of the present invention.

FIG. 2 is a block diagram illustrating a mobile terminal according to an embodiment of the present invention. Referring to FIG. 2, the mobile terminal 200 comprises a wireless transceiver 210, a data processor 220, an audio processor 230, a memory 240, a display 250, an input device 260, a controller 270, an account database 280, and a backup database 290.

The wireless transceiver 210 performs a communication function for the mobile terminal 200. The wireless transceiver 210 comprises a RF transmitter for up-converting and amplifying a frequency of the transmitted signal, and a RF receiver for low-noise amplification of a received signal and down-converting the frequency of the received signal.

According to an embodiment of the present invention, by communicating with the OTA server 140, the wireless transceiver 210 receives various OTA data from the OTA server.

The data processor 220 cooperates with transceiver 210 for encoding and modulating a transmitting signal, and for decoding and demodulating a received signal. The data processor 220 performs an update of the mobile terminal 200 using OTA data received from the OTA server 140, and informs a controller 270 of the update result.

The audio processor 230 plays an audio signal that is decoded and outputted by the data processor 220, or sends the audio signal produced by a microphone (MIC) to the data processor 220.

The memory 240 comprises program memory and data memory. The program memory stores programs for controlling general operations of the mobile terminal 200.

The display 250 displays various menu screens and other information. The display 250 may comprise a Liquid, Crystal Display (LCD) or an Organic Light Emitting Diode (OLED). The display 250 may also comprise two or more displays including an external display and an inner display.

Under the control of the controller 270, the display 250 displays a popup window informing the user if the data reset update has failed. The display 250 also displays a reset menu screen for performing initialization of the mobile terminal 200.

The input device 260 comprises at least one button or other device for inputting numeral and character information, and at least one function button for inputting various input functions. The input device 260 may comprise a keypad, a jog-dial, a touch screen, a joystick, and other input components, comprising a directional key.

By way of example, the input device 260 receives a reset request from the user and sends the reset request to the controller 270. The input device 260 also sends to the controller 270 a data value set by the user.

The controller 270 performs the general control of the mobile terminal 200. The controller 270 may also comprise the data processor 220.

According to an embodiment of the present invention, when a data update is performed using the OTA data received from the OTA server 140, the OTA data is stored in the account database 280 and in the backup database 290. The controller 270 also controls the storing of data set by the user through the input device 260 in the account database 280.

When the user requests a reset for the mobile terminal 200 through the input device 260, the controller 270 performs the reset initialization by setting the OTA data stored in the backup database 290 as an active setting value, and changing user setting data stored only in the account database 280 to a default data value set when the mobile terminal is manufactured.

Figure 3:
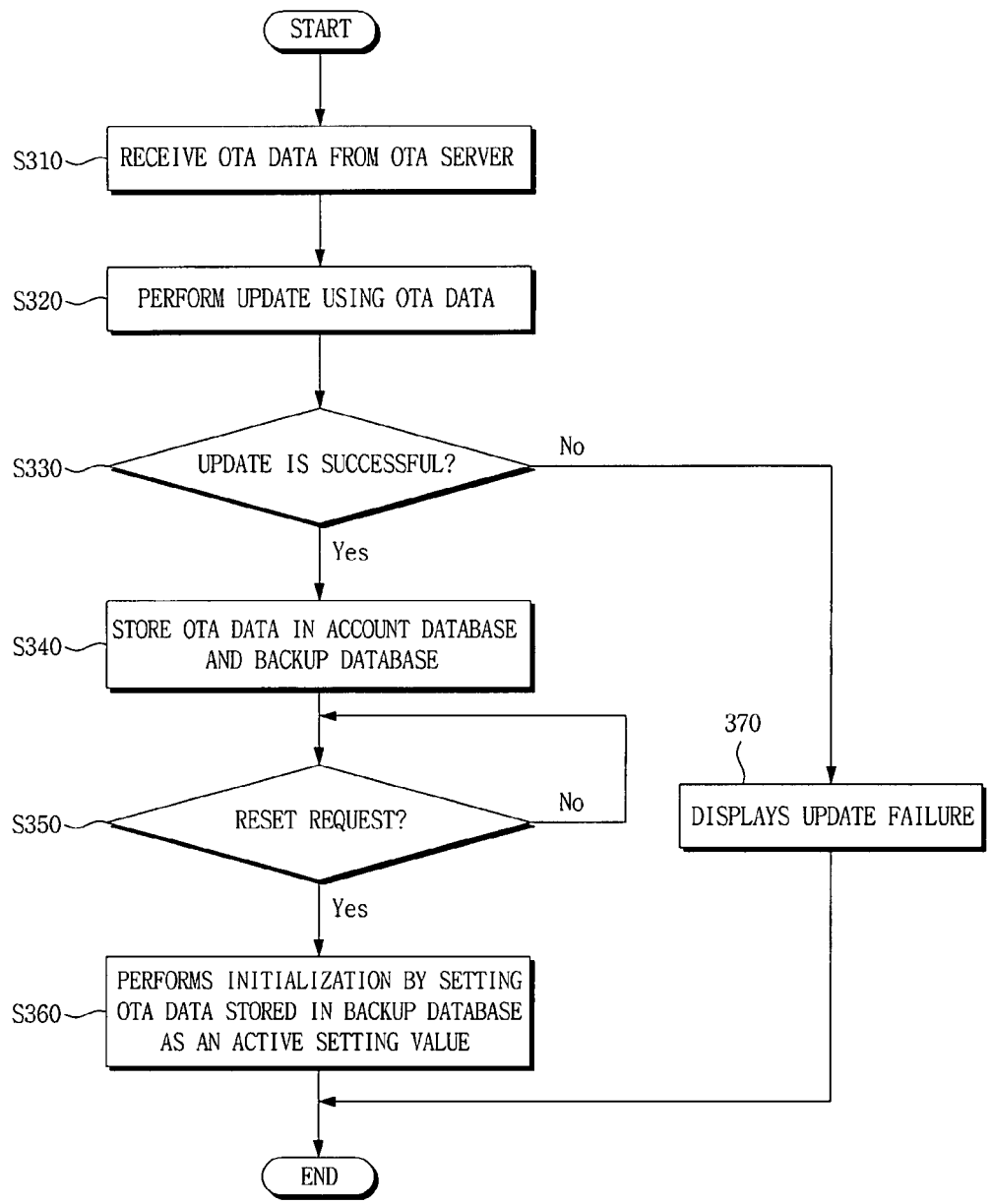
FIG. 3 is a flow chart illustrating a process for initializing the mobile communication terminal using OTA data backup according to an embodiment of the present invention.

FIG. 3 is a flow chart illustrating a method for initializing the mobile terminal using OTA data backup according to an embodiment of the present invention. Referring to FIG. 3, the mobile terminal 200 receives the OTA data from the OTA server 140 through the wireless transceiver 210 (S310). The data processor 270 performs an update of the mobile terminal 200 using the received OTA data (S320).

If it is determined that the OTA data update failed (S330), the data processor 220 informs the controller 270 of the update failure. The controller displays a popup window on the display 250 informing the user that the update has failed (S370).

If the update is successful (S330), the data processor 220 sends the OTA data to the controller 270. Under the control of the controller 270, the OTA data is stored in the account database 280 and the separate backup database 290 (S340).

The OTA data stored in the account database 280 is set as the active setting value of the mobile terminal 200. The account database 280 stores data set by the user and the OTA data. The data values stored in the account database 280 are set as the active setting value of the mobile terminal 200 until the mobile terminal 200 is initialized by the user's reset request.

When the OTA data and the user's setting data are stored in the account database 280 and in the backup database 290, if the user requests a reset of the mobile terminal 200 (S350), then the controller 270 performs the initialization by setting the OTA data stored in the backup database 290 as the active setting value (S360).

Figure 4:
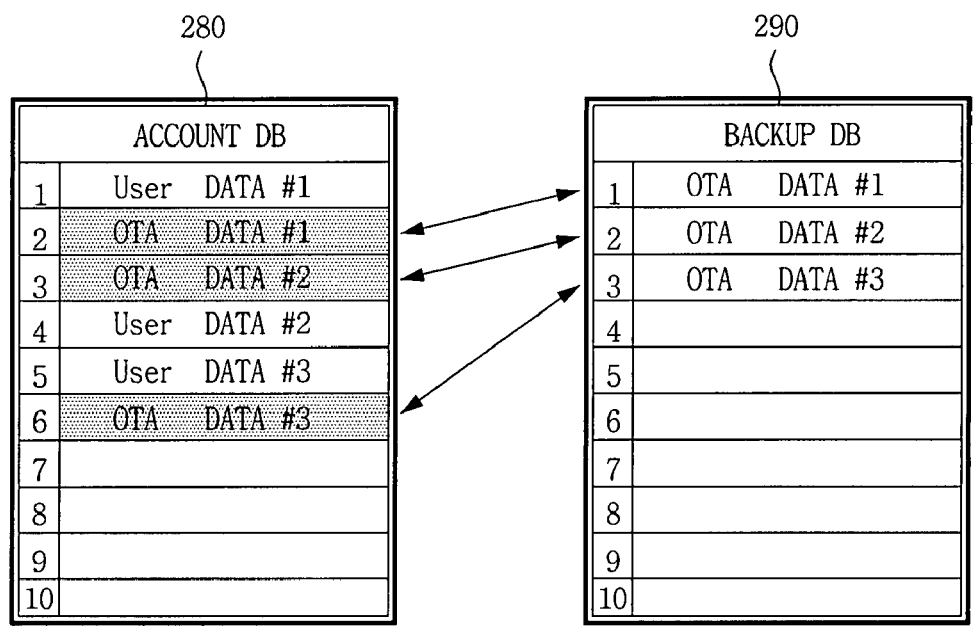
FIG. 4 illustrates an example for storing OTA data and user setting data in an account database, and a backup database according to an embodiment of the present invention.

FIG. 4 illustrates an example for storing the OTA data and the user setting data in an account database and a backup database according to an embodiment of the present invention. Referring to FIG. 4, OTA data #1, #2 and #3, each of which is received from the OTA server 140, are stored in the account database 280 and in the backup database 290.

For example, the user setting data, i.e., user data #1, #2 and #3, are stored the account database 280, but are not stored in the backup database 290. The data values stored in the account database 280 are set as an active setting value of the mobile terminal 200.

When the OTA data and the user's setting data are stored in the account database 280 and in the backup database 290, if the user requests a reset of the mobile terminal 200 (S350), then the controller 270 performs the initialization by setting the OTA data stored in the backup database 290 as the active setting value (S360).

Figure 5:
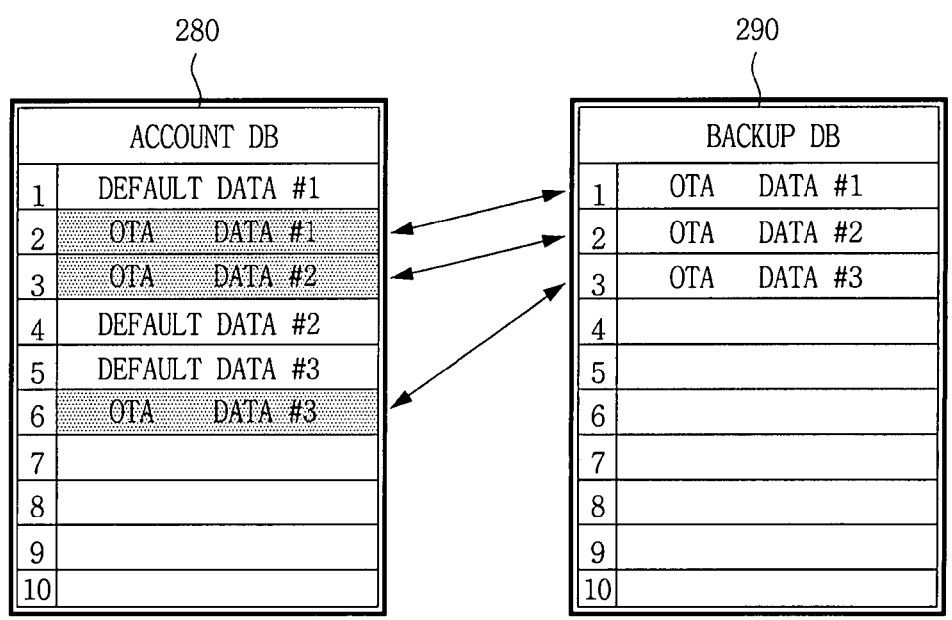
FIG. 5 illustrates the databases of FIG. 4 after the mobile communication terminal is reset, the OTA data and user setting data being stored in the account database and the backup database.

FIG. 5 illustrates the databases of FIG. 4 after the mobile terminal is reset, the OTA data and user setting data being stored in the account database and the backup database. With reference to FIG. 5, a method for performing initialization of the mobile terminal 200 will be explained.

When the user requests a reset, the controller 270 does not perform the initialization of the mobile terminal based on the manufactured default data value, but performs initialization in accordance with the OTA data stored in the backup database 290, and then storing the set OTA data in the account database 280.

Accordingly, even when the initialization is performed by the reset request of the user, the OTA data stored in the account database 280 and in the backup database 290 is not changed, but remains the same as prior to the reset function.

Since the OTA data provided by the communication service provider is not deleted when the mobile terminal is reset, the mobile terminal 200 can maintain the latest version of the OTA data provided by the communication service provider.

Alternatively, since the user setting data, i.e., user data #1, #2 and #3 are not stored in the backup database 290, the controller 270 may perform the initialization function by changing the user setting data to the manufacturers default data value set when the mobile terminal 200 was manufactured, where the default data value comprises default data #1, #2 and #3.

As described above, the mobile terminal performs the initialization function by storing the OTA data received from the OTA server 140 in the separate backup database 290, and setting the OTA data stored in the backup database as the active setting value when the reset operation is performed. Accordingly, since the mobile terminal is initialized using the latest version of the OTA data received from the communication service provider, the downgrade of the mobile terminal can be prevented.

The embodiments of the present invention have been described for illustrative purposes, and those skilled in the art will appreciate that various modifications, additions and substitutions are possible without departing from the scope of the present invention should be defined by the appended claims and their legal equivalents.

What is claimed is:

1. A method for initializing a mobile terminal using over-the-air (OTA) data, the method comprising:
   receiving OTA data from a wireless network entity;
   storing the OTA data received from the wireless network entity in a first database and a second database,
   wherein the first database and a second database are associated with the mobile terminal;
   receiving a reset request for initialization of parameters, stored in the first database, associated with the operation of the mobile terminal; and
   responsive to the reset request, updating the parameters of the first database with corresponding parameters of the OTA data stored in the second database, and
   updating the parameters of the first database with default parameters when the parameters of the first database do not correspond with the parameters of the OTA data stored in the second database,
   wherein the initialization of parameters stored in the first database is based on a most recent OTA data stored in the second database when the mobile terminal receives the reset request.

2. The method of claim 1, wherein the default parameters comprise manufacturer default values.

3. The method of claim 2, further comprising:
storing user setting data and data changed by a user in the first database,
wherein the user setting data stored in the first database is initialized to the default parameters when the mobile terminal receives the reset request.

4. The method of claim 3, wherein the user setting data and the data changed by the user are not stored in the second data base.

5. The method of claim 1, further comprising:
displaying a reset menu screen for performing initialization of the mobile terminal.

6. The method of claim 5, further comprising:
displaying a pop-up window informing a user when the OTA data update fails.

7. The method of claim 1, wherein the OTA data comprises at least a data communication service, a voice communication service, a multimedia service, or a software upgrade.

8. The method of claim 1, wherein the first database comprises an account database and the second database comprises a backup database.

9. A mobile terminal comprising:
a receiver for receiving over-the-air (OTA) data from a wireless network entity;
a first database and a second database configured to store the OTA data;
an input device for receiving a reset request which requests initialization of parameters, stored in the first database, associated with the operation of the mobile terminal; and
a controller configured to:
update parameters of the first database with corresponding parameters from the OTA data stored in the second database in response to the reset request, and
update the parameters of the first database with default parameters when the parameters of the first database do not correspond to the parameters from the OTA data stored in the second database,
wherein the controller performs initialization of parameters, stored in the first database, based on a most recent OTA data stored in the second database when the mobile terminal receives the reset request.

10. The mobile terminal of claim 9, wherein the default parameters comprise manufacturer default values.

11. The mobile terminal of claim 10, wherein the controller initializes the setting data stored in the first database to the default parameters upon receiving the reset request via the input device.

12. The mobile terminal of claim 9, wherein the controller stores setting data changed by a user via the input device in the first database.

13. The mobile terminal of claim 9, further comprising a display configured to display a reset menu screen for performing initialization of the mobile terminal.

14. The mobile terminal of claim 13, wherein the display displays a pop-up window informing a user when the OTA data update fails.

15. The mobile terminal of claim 9, wherein the OTA data comprises at least a data communication service, a voice communication service, a multimedia service, or a software upgrade.

16. The mobile terminal of claim 9, wherein the input device comprises at least a keypad, a joy stick, a jog-dial, or a touch screen.

17. The mobile terminal of claim 9, wherein the receiver comprises:
a RF transmitter for up-converting and amplifying a frequency of a transmitted OTA data signal; and
a RF receiver for low-noise amplification of a received OTA data signal and down-converting the frequency of the received signal.

18. The mobile terminal of claim 9, wherein the first database comprises an account database and the second database comprises a backup database.

\* \* \* \* \*